United States Patent
Kojima et al.

Patent Number: 6,034,450
Date of Patent: Mar. 7, 2000

[54] STEPPING MOTOR AND METHOD OF MANUFACTURING HARD MAGNETIC ALLOY THEREFOR

[75] Inventors: Akinori Kojima; Akihiro Makino; Takashi Hatanai; Yutaka Yamamoto, all of Nagaoka; Akihisa Inoue, Sendai, all of Japan

[73] Assignee: Alps Electric Co., Ltd., Japan

[21] Appl. No.: 09/111,991

[22] Filed: Jul. 8, 1998

[30] Foreign Application Priority Data

Jul. 8, 1997 [JP] Japan .................................. 9-182871

[51] Int. Cl.⁷ .............................. H01F 1/02; H02K 37/00; H02K 1/02
[52] U.S. Cl. ............................. 310/49 R; 148/101; 310/44
[58] Field of Search ..................................... 310/49 R, 44; 148/302, 301, 101

[56] References Cited

U.S. PATENT DOCUMENTS

| | | | |
|---|---|---|---|
| 4,406,958 | 9/1983 | Palmero et al. | 310/49 R |
| 5,000,796 | 3/1991 | Chatterjee | 148/101 |
| 5,049,208 | 9/1991 | Yajima et al. | 148/302 |
| 5,089,065 | 2/1992 | Hamano et al. | 148/302 |
| 5,641,363 | 6/1997 | Fukuno et al. | 148/104 |
| 5,750,044 | 5/1998 | Yoneyama et al. | 148/301 |

*Primary Examiner*—Elvin Enad
*Assistant Examiner*—Burton Mullins
*Attorney, Agent, or Firm*—Brinks Hofer Gilson & Lione

[57] ABSTRACT

In a stepping motor having a stator provided with an electromagnet and a rotor composed of a hard magnetic alloy, the hard magnetic alloy comprises at least one element T of Fe and Co, at least one element R of rare earth elements and B, has a remanence ratio of at least 0.7, remanent magnetization (Ir) of at least 120 emu/g and coercive force (iHc) of at least 1 kOe and includes a fine crystalline phase having an average crystal grain size of 100 nm or less as a main phase. The hard magnetic alloy is solidified and compacted by making use of a softening phenomenon which arises when the amorphous phase contained in the structure of the hard magnetic alloy is crystallized. A method of manufacturing the hard magnetic alloy used to the stepping motor is also disclosed.

12 Claims, 13 Drawing Sheets

STEPPING MOTOR AND METHOD OF MANUFACTURING HARD MAGNETIC ALLOY THEREFOR

BACKGROUND OF THE INVENTION

The present invention relates to a stepping motor and a method of manufacturing a hard magnetic alloy therefor.

DESCRIPTION OF THE RELATED ART

Stepping motors are a special motor capable of arbitrarily controlling the amount of rotation thereof in response to a pulse current. Since they do not require feedback control and can position an open loop, they have been used in various fields as a drive source for a positioning control system. In particular, since hybrid type stepping motors have high rotation torque even if they are small in size and can execute positioning control at a pinpoint accuracy, they have been used as a drive source of a drive mechanism in copy machines, computers and so on.

The hybrid type stepping motor (hereinafter, abbreviated as an HB type motor) will be described below with reference to drawings.

In FIG. 1, an HB type motor 1 is composed of a stator 3 having stator members 2 as the magnetic core of an electromagnet and a rotor 4.

A plurality of teeth-like stator member pole teeth 5 are formed to the surface of each of the stator members 2 on the rotor 4 side thereof. The stator member 2 is composed of a soft magnetic substance having high permeability. A lead wire 6 is wound around each of the stator members 2 and the stator members 2 and the lead wires 6 constitute the electromagnet. The lead wires 6 are connected to a not shown drive circuit.

A current having alternately opposite polarities is supplied from the drive circuit to the lead wires 6 to thereby alternately magnetize the stator member pole teeth 5 to an N-pole and an S-pole.

In FIG. 1 and FIG. 2A, the rotor 4 is composed of a shaft 7, a cylindrical hard magnetic alloy 8 through which the shaft 7 is inserted and two sets of cylindrical rotor members 9, 10 which are fitted to both the ends of the hard magnetic alloy 8.

The hard magnetic alloy 8 is disposed so that the direction of magnetic flux is in parallel with the lengthwise direction of the shaft 7. The rotor members 9, 10 are composed of a soft magnetic substance having high permeability. The rotor member 9 is magnetized to an N-pole and the rotor member 10 is magnetized to an S-pole.

A plurality of teeth-like rotor member pole teeth 11 are formed to the surface of the rotor member 9 on the stator members 2 side thereof, whereas a plurality of teeth-like rotor member pole teeth 12 are formed to the surface of the rotor member 10 on the stator members 2 side thereof.

As shown in FIG. 2B, the rotor member pole teeth 11 and the rotor member pole teeth 12 are disposed to both the ends of the hard magnetic alloy 8 in such a manner that the valley portions 13 and ridge portions 14 of them are displaced in the lengthwise direction of the shaft 7.

An operation of the HB type motor 1 will be described below.

In FIG. 3A and FIG. 3B, the stator member pole tooth 5a of a stator member 2a is magnetized to an N-pole and the stator member pole tooth 5b of a stator member 2b is magnetized to an S-pole by the current imposed on the lead wire 6 from the drive circuit.

Since the rotor member pole teeth 11 of the rotor member 9 are magnetized to the N-pole, the magnetic flux between the rotor member pole teeth 11 and the stator member pole tooth 5a is canceled, whereas the magnetic flux between the rotor member pole teeth 11 and the stator member pole tooth 5b is intensified.

Further, since the rotor member pole teeth 12 of the rotor member 10 are magnetized to the S-pole, the magnetic flux between the rotor member pole teeth 12 and the stator member pole tooth 5a is intensified, whereas the magnetic flux between the rotor member pole teeth 12 and the stator member pole tooth 5b is canceled.

Since the rotor member pole teeth 11 and another rotor member pole teeth 12 are disposed so that the valley portions 13 and ridge portions 14 of them are displaced, the rotor member pole teeth 11 and the stator member pole tooth 5b are attracted toward each other, whereas the rotor member pole teeth 12 and the stator member pole tooth 5b are attracted toward each other. As a result, the rotor member 9 and the rotor member 10 rotate toward the direction of the arrows in FIG. 3 by one ridge 14 of the rotor member pole teeth 11, 12.

Next, in FIG. 4A and FIG. 4B, when the stator member pole tooth 5a is magnetized to the S-pole and the stator member pole tooth 5b is magnetized to the N-pole by changing the current from a control circuit, the magnetic flux between the rotor member pole teeth 11 and the stator member pole tooth 5a is intensified, whereas the magnetic flux between the rotor member pole teeth 11 and the stator member pole tooth 5b is canceled.

Further, the magnetic flux between the rotor member pole teeth 12 and the stator member pole tooth 5a is canceled, whereas the magnetic flux between the rotor member pole teeth 12 and the stator member pole tooth 5b is intensified.

Since the rotor member pole teeth 11 and the stator members pole tooth 5a are attracted toward each other and the rotor member pole teeth 12 and the stator member pole tooth 5b are attracted toward each other, the rotor member 9 and the rotor member 10 rotate in the left direction in FIG. 4 by one ridge 14 of the rotor member pole teeth 11, 12.

The rotor 4 can be driven at a prescribed rotating angle by flowing the current from the drive circuit to the HB type motor 1, as described above.

Incidentally, the characteristics of a hard magnetic alloy is represented by the second quadrant of a hysteresis curve, that is, by a demagnetizing curve. Since the hard magnetic alloy which has been magnetized is in a magnetic field in an opposite direction which is made by the remanent magnetization of itself, that is, in a diamagnetic filed, its operating point (the magnetic flux density (B) and demagnetization field (H) of a material) is specified at one point p on the demagnetizing curve. The value of $B/\mu_0 H$ (non-dimensional) is called a permeance coefficient (p). The permeance coefficient (p) depends on a shape of the hard magnetic alloy. The permeance coefficient (p) is decreased by a decrease in the length of the hard magnetic alloy in its magnetizing direction and increased by an increase in it.

The correlation represented by the following formula (1) is established between the permeance coefficient (p) and a diamagnetic filed coefficient (N):

$$p = (1-N)/N \qquad (1)$$

Therefore, when the shapes of the demagnetizing curve and hard magnetic alloy are given, the energy of a static magnetic field which is externally made by a magnet is given by the following formula (2):

$$U = BHV/2 \quad (2)$$

(in the formula, V represents the volume of the hard magnetic alloy.) The diamagnetic field, that is, the permeance coefficient is changed by the change of the shape of the hard magnetic alloy and thus the operating point p is changed and the value U is changed accordingly. The value U is maximized at an operating point $p_m$ located at some midpoint and the product (BH) at the time is a maximum energy product $((BH)_{max})$.

In general, the remanent magnetization (Ir) of a hard magnetic alloy has a property that it is decreased by the increase of temperature. The value obtained by dividing the amount of change of the remanent magnetization (dIr) by the amount of change of temperature (dT) is called a magnetization temperature coefficient. A smaller absolute value of the magnetization temperature coefficient results in a smaller amount of change of the remanent magnetization to temperature.

It is important to use a hard magnetic alloy that has a large maximum energy product $((BH)_{max})$ and a small absolute value of a magnetization temperature coefficient to enhance the rotational torque of a stepping motor.

Since the magnitude of the rotational torque of the stepping motor is proportional to the product of the magnitude of a current flown to the stepping motor and the energy (U) of a static magnetic field externally made by the hard magnetic alloy, an increase in the maximum energy product $((BH)_{max})$ enhances the rotational torque of the stepping motor.

It is necessary to make a demagnetizing curve to a square shape and increase the area surrounded by the demagnetizing curve, a magnetic field axis and a magnetizing axis, that is, to increase a remanence ratio (Ir/Is) as well as remanent magnetization (Ir) and coercive force (iHc) in order to increase the maximum energy product $((BH)_{max})$ of the hard magnetic alloy.

When a hard magnetic alloy having a large absolute value of the magnetization temperature coefficient is used as the stepping motor and a rotor is rotated by flowing a current to the stepping motor, the temperature of the hard magnetic alloy is gradually increased by the heat generated by the repeated excitation of an electromagnet and the copper loss of a lead wire and the rotational torque of the stepping motor is lowered by the drop of magnetic flux density (B) at an operating point. To cope with this problem, the absolute value of the magnetization temperature coefficient of a hard magnetic alloy which will be used must be as small as possible.

From the above-mentioned, an alnico magnet that has high remanent magnetization (Ir) and a low absolute value of a magnetization temperature coefficient and a Nb—Fe—B system sintered magnet and a Sm—Co system sintered magnet that has a high coercive force (iHc) have been used as the rotor of conventional HB type motors.

However, the stepping motor using the alnico magnet has a problem that it is difficult to reduce the size of the stepping motor because the alnico magnet has a low coercive force (iHc) of 1 kOe.

Further, the Nb—Fe—B system sintered magnet and the Sm—Co system sintered magnet are employed to some small-sized stepping motors because they have a high coercive force (iHc). However, these magnets have a problem that their manufacturing cost is increased and the manufacturing cost of the stepping motors is made expensive accordingly because they use a large amount of expensive rare earth elements such as at least 10 at % of Nd or at least 8 at % of Sm.

Further, the Nb—Fe—B system sintered magnet has a problem that the rotational torque of the stepping motors is lowered at a high temperature because the magnet has a large absolute value of a magnetization temperature coefficient.

SUMMARY OF THE INVENTION

An object of the present invention made to solve the above problems is to provide a stepping motor which can be made in a small size, has large rotational torque which is not dropped in a large quantity at a high temperature and can be manufactured at a low cost.

Another object of the present invention is to provide a method of manufacturing a hard magnetic alloy for the stepping motor which can be made in a small size, has large rotational torque which is not dropped in a large quantity at a high temperature and can be manufactured at a low cost.

To achieve the above objects, a first invention is a stepping motor having a stator provided with an electromagnet and a rotor composed of a hard magnetic alloy, wherein the hard magnetic alloy comprises at least one element T of Fe and Co, at least one element R of rare earth elements and B and has a remanence ratio (Ir/Is) of at least 0.7.

In the stepping motor of the first invention, it is preferable that the hard magnetic alloy has remanent magnetization (Ir) of at least 120 emu/g and coercive force (iHc) of at least 2 kOe.

In the stepping motor of the first invention, it is preferable that the hard magnetic alloy contains a fine crystalline phase having an average crystal grain size of 100 nm or less as a main phase.

In the stepping motor of the first invention, it is preferable that the hard magnetic alloy has a composition represented by the following formula:

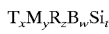

wherein T represents at least one element selected from Fe and Co, M represents at least one element selected from Nb, Zr, Hf and Ta and R represents at least one element selected from rare earth elements and suffixes x, y, z, w and t which represent a composition ratio satisfy $88 \leq x \leq 92$, $0.5 \leq y \leq 3$, $3 \leq z \leq 7$, $3 \leq w \leq 7$ and $0 \leq t \leq 5$ atomic percent.

In the stepping motor of the first invention, it is preferable that the absolute value of a magnetization temperature coefficient of the hard magnetic alloy is 0.1%/° C. or less when it is used in a shape in which a permeance coefficient is made to at least 10.

To achieve the above objects, a second invention is a method of manufacturing a hard magnetic alloy used to a stepping motor having a stator provided with an electromagnet and a rotor composed of the hard magnetic alloy, the method comprising the step of solidifying and compacting the hard magnetic alloy that contains at least one element T of Fe and Co, at least one element R of rare earth elements and B, by making use of a softening phenomenon which arises when the amorphous phase contained in the structure of the hard magnetic alloy is crystallized.

It is preferable to precipitate a fine crystalline phase having an average crystal grain size of 100 nm by subjecting the hard magnetic alloy manufactured by the manufacturing method of the second invention to heat treatment.

Further, in the second invention, it is preferable that when the heat treatment is executed, a heating rate is set to at least 10° C./min, a holding time is set within the range of 600–800° C. and a holding time is set within the range of 1–60 minutes.

BRIEF DESCRIPTION OF THE DRAWINGS

FIG. 2A and FIG. 2B are views showing the rotor of the hybrid type stepping motor, wherein FIG. 2A is a sectional plan view of the rotor and FIG. 2B is a schematic view showing the positional correlation between the two rotor member pole teeth of the rotor;

FIG. 3A and FIG. 3B are views describing an operation of the hybrid type stepping motor, wherein FIG. 3A is an enlarged schematic view showing a rotor member and stator members and FIG. 3B is an enlarged schematic view showing another rotor member and another stator members;

FIG. 4A and FIG. 4B are views describing an operation of the hybrid type stepping motor, wherein FIG. 4A is an enlarged schematic view of the rotor member and the stator members and FIG. 4B is an enlarged schematic view showing the another rotor member and the another stator members;

DESCRIPTION OF THE PREFERRED EMBODIMENT

Figure 1:
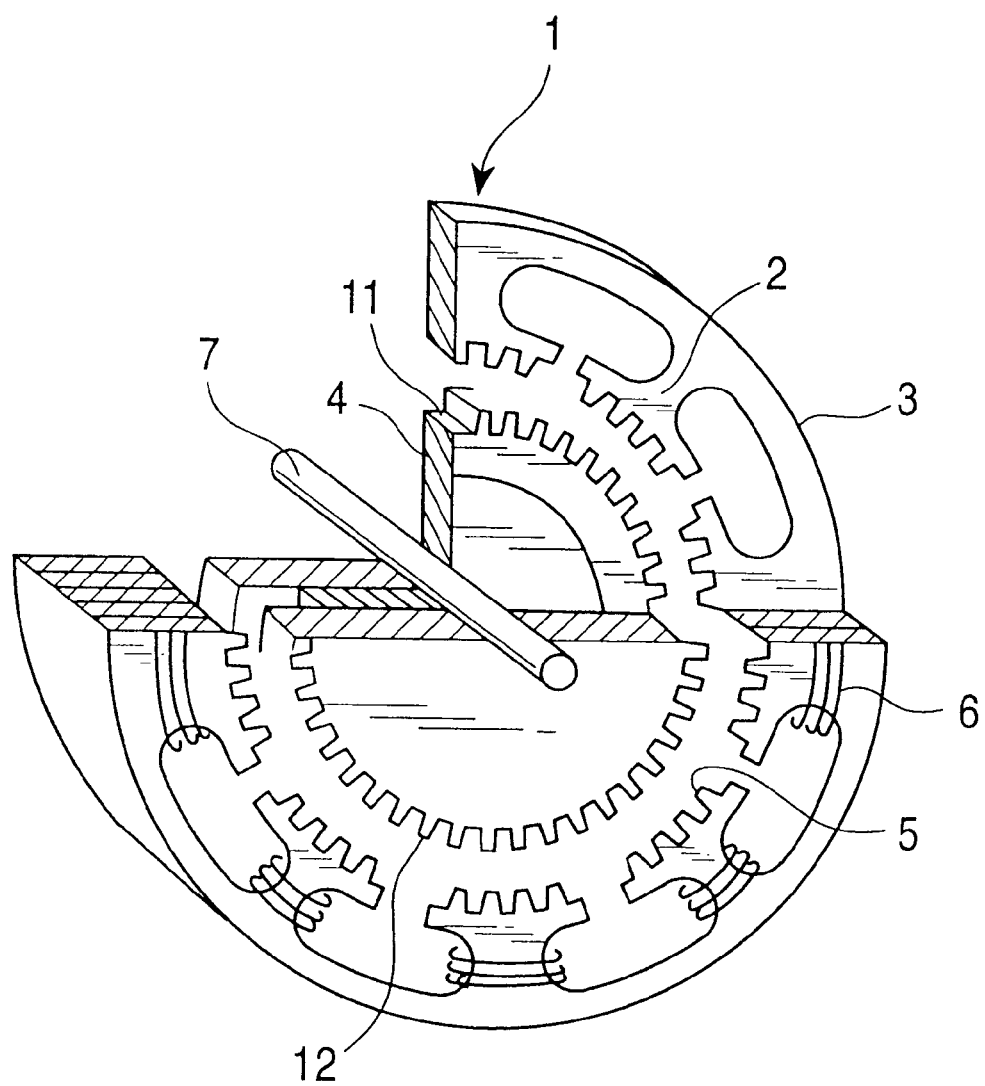
FIG. 1 is a perspective sectional view showing a hybrid type stepping motor.
Figure 2A:
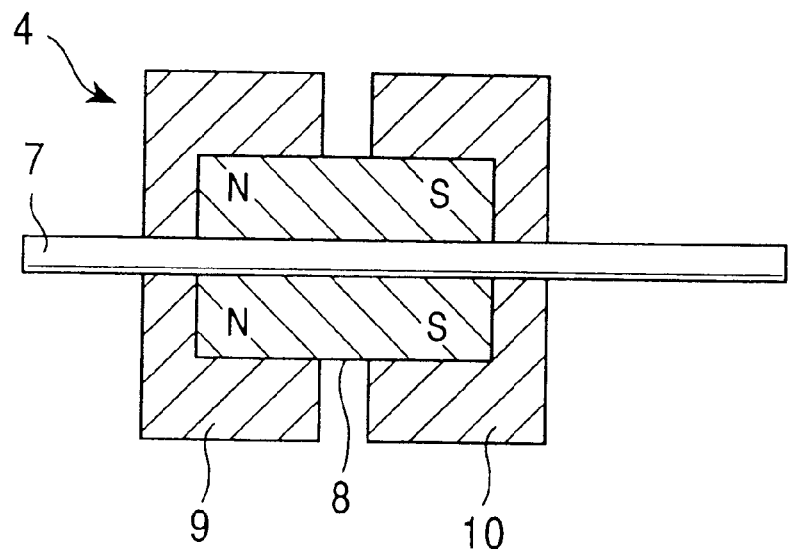
Figure 2B:
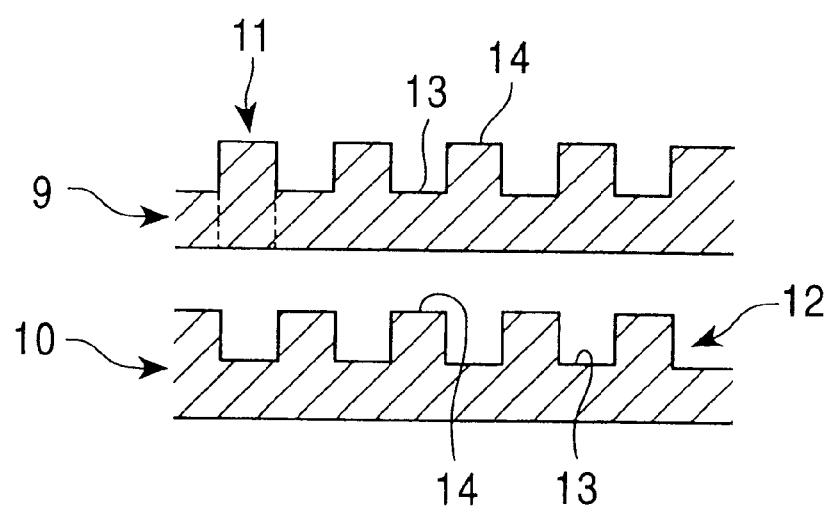
Figure 3A:
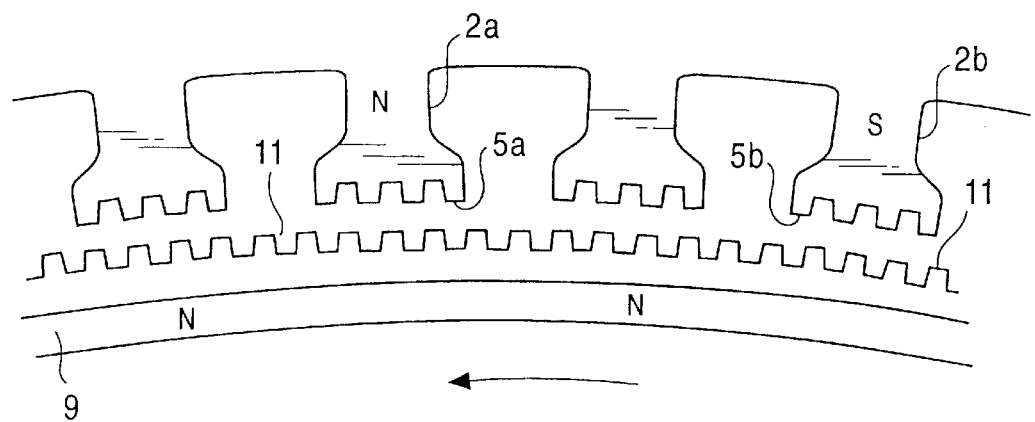
Figure 3B:
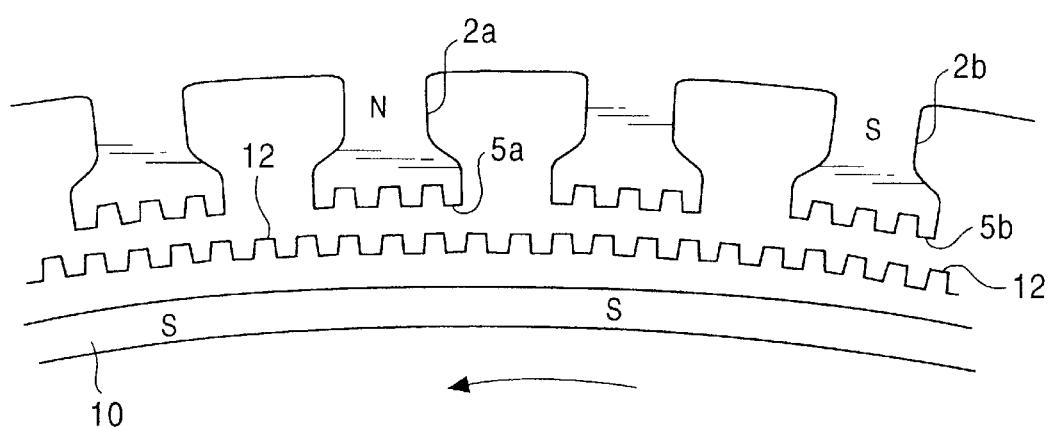
Figure 4A:
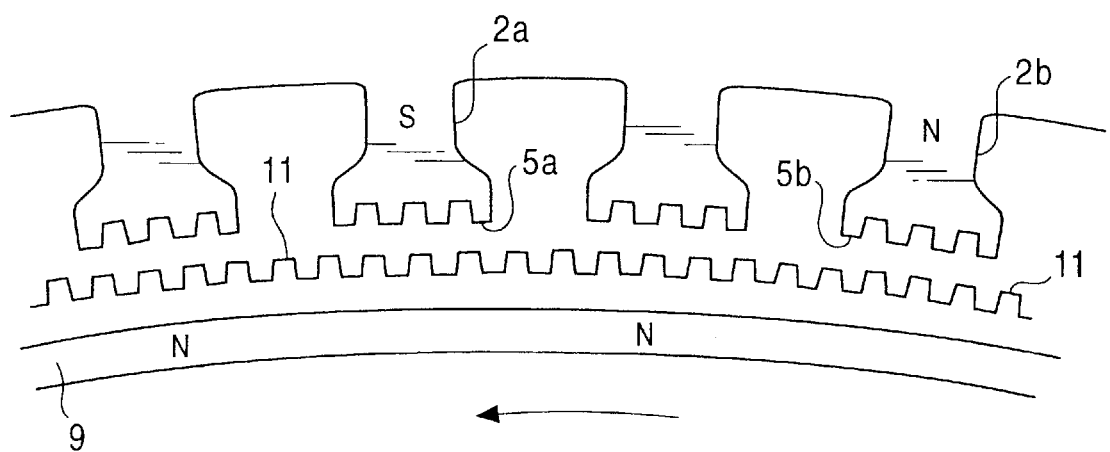
Figure 4B:
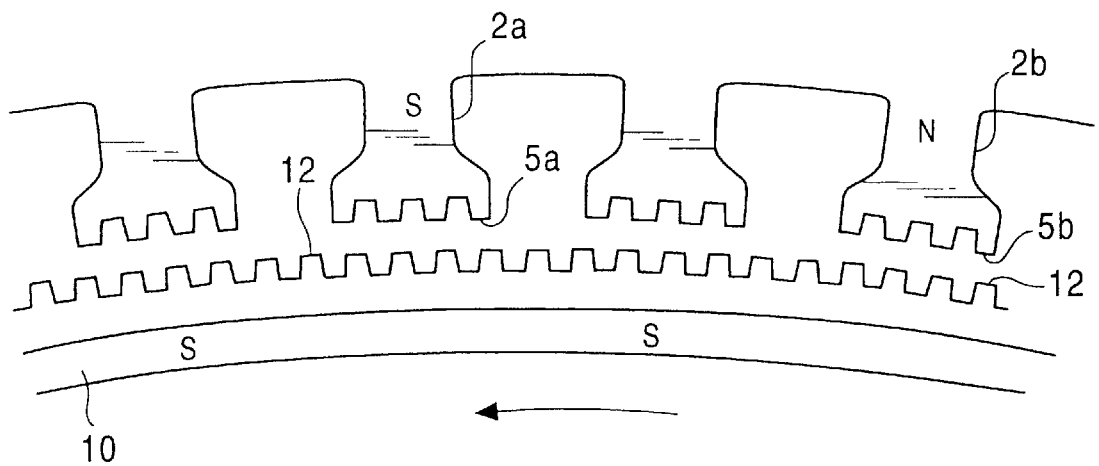

A stepping motor of the present invention includes a rotor composed of a hard magnetic alloy. The hard magnetic alloy comprises at least one element Y of Fe and Co, at least one element R of rare earth elements and B and has a fine crystalline phase having an average crystal grain size of 100 nm or less as a main phase.

An Fe phase formed to a body-centered cubic structure having an average crystal grain size of 100 nm or less and an $R_2Fe_{14}B$ phase (in the formula, R represents at least one element of rare earth elements) having an average crystal grain size of 100 nm or less precipitate to the fine crystalline phase. Further, the hard magnetic alloy forms a nano-composite texture which is composed of the fine crystalline phase and a remaining amorphous phase, and the fine crystalline phase is mainly composed of the Fe phase formed to the body-centered cubic structure, the $R_2Fe_{14}B$ phase and an $Fe_3B$ phase.

The fine crystalline phase includes a soft magnetic phase or a semi-hard magnetic phase having coercive force of 1 kOe or less and a hard magnetic phase having coercive force of 1 kOe or more formed therein in a mixed state. Otherwise, the fine crystalline phase is arranged such that a fine crystalline phase having an average crystal grain size of 100 nm or less is precipitated in a structure composed of the amorphous phase as well as the mixed phase state is formed in the fine crystalline phase. Further, it is possible to provide the crystallographic axis of the hard magnetic phase with anisotropy.

It is preferable that the hard magnetic alloy contains the soft magnetic phase or semi-hard magnetic phase and the hard magnetic phase in an amount of 10 vol %, respectively because the hard magnetic alloy can obtain characteristics which stand midway between those of the soft magnetic phase or semi-hard magnetic phase and those of the hard magnetic phase by the above arrangement. It is not preferable that the content of the soft magnetic phase or semi-hard magnetic phase is less than 10 vol % because the concentration of rare earth elements which are necessary to constitute the hard magnetic phase is increased and remanent magnetization (Ir) is lowered by it, although the coercive force (iHc) of the hard magnetic alloy is increased. It is also not preferable that the content of the hard magnetic phase is less than 10 vol % because the coercive force (iHc) of the hard magnetic alloy is lowered.

In addition, the provision of anisotropy with the crystallographic axis of the hard magnetic phase permits it to obtain higher remanent magnetization (Ir) as compared with a case that the crystallographic axis is provided with isotropy.

It is preferable that the hard magnetic alloy used to the rotor of the stepping motor of the present invention has a small absolute value of a magnetization temperature coefficient to prevent the drop of rotational torque caused by a temperature increase when the stepping motor is used. Since the hard magnetic alloy used to the stepping motor of the present invention has a small absolute value of the magnetization temperature coefficient of 0.1%/° C. or less when it is used in a shape in which the permeance coefficient (p) is made to 10 or more, the drop of the rotational torque of the stepping motor at a high temperature can be prevented.

A method of manufacturing the hard magnetic alloy comprises the step of solidifying and compacting the hard magnetic alloy that contains at least one element T of Fe and Co, at least one element R of rare earth elements and B, by making use of a softening phenomenon which arises when the amorphous phase contained in the structure of the hard magnetic alloy is crystallized.

More specifically, the alloy powders (powder particles) to be compacted are prepared. The alloy powders are obtained by a process of quenching a molten alloy and forming it to a ribbon or powders and a process of grinding the ribbon to alloy powders. The thus obtained alloy powders have a particle size of about 50 μm–150 μm and have an amorphous phase as a main phase.

There can be used a method of spraying a molten alloy onto a rotating drum and forming the molten alloy to a thin strip shape by quenching it, a method of ejecting the molten metal into a cooling gas and forming the molten metal to powers by quenching it in a droplet state, a sputtering method, a CVD method and so on as a method of obtaining an amorphous alloy or an amorphous alloy slightly containing a crystalline phase from the molten alloy. The amorphous alloy used in the present invention may be made by any of the above methods.

The thin strip alloy and the alloy powders obtained by being quenched are composed of a structure in which fine crystalline phase having an average crystal grain size of 100 nm or less is precipitated or a structure composed of an amorphous phase.

Subsequently, the amorphous phase of the thus obtained alloy powders is crystallized or the fine crystalline phase thereof is grown to particles while applying stress to the alloy powders and the alloy powders are densely pressed simultaneously with the above process or subsequently thereto. As a result, a soft magnetic phase or a semi-hard magnetic phase and a hard magnetic phase are formed in a mixed phase state in the structure in which the fine crystalline phase having the average crystal grain size of 100 nm or less is precipitated. Otherwise, the fine crystalline phase having the average crystal grain size of 100 nm or less is precipitated in the structure composed of the amorphous phase and the above mixed phase state is formed as well as anisotropy is provided with the crystallographic axis of the hard magnetic phase.

The provision of anisotropy with the crystallographic axis of the hard magnetic phase as described above permits it to obtain higher remanent magnetization (Ir) as compared with a case that the crystallographic axis is provided with isotropy.

When the alloy powders are densely pressed, it is preferable to solidify and compact them, making use of a softening phenomenon which arises when the amorphous phase is crystallized. The softening phenomenon is remarkably arisen by heating the amorphous phase in the amorphous alloy to a crystallizing temperature or to a temperature near to it and at the time the amorphous alloy powders are bonded to and integrated with each other under pressure. Therefore, the solidifying and compacting operation is preferably executed making use of the above remarkable softening phenomenon so that a hard magnetic alloy having high density can be obtained.

When the alloy powders are solidified and compacted by being densely pressed, it is preferable to use an amorphous alloy containing the amorphous phase in an amount of at least 50 wt %, because the amorphous alloy results in a permanent magnet which has strong bond and strong hard magnetism.

A spark plasma sintering apparatus is exemplified as an apparatus for manufacturing the hard magnetic alloy from the alloy powders. In this case, the hard magnetic alloy may be obtained by compacting the alloy powders by applying a pressure thereto and at the same time imposing a pulse current on the alloy powders and heating them to the crystallizing temperature of the amorphous alloy or to a temperature near to the above temperature for a prescribed time so that the alloy powders are crystallized or grown to particles, or increasing the temperature of the alloy powders by imposing the pulse current thereon and applying the pressure to the alloy powders from above and below them at the temperature near to the crystallizing temperature of the amorphous alloy.

The pressure which will be imposed when the spark plasma sintering method is executed is 200–1500 Mpa and preferably 500–1000 Mpa to permit the aforesaid crystallization, growth to particles and. A pressure less than 200 Mpa is not preferable because the resulting hard magnetic alloy has a large void ratio and a small compacted density. Whereas, a pressure exceeding 1500 Mpa is not also preferable because the strength of the dies of the spark plasma sintering apparatus is made insufficient at a high temperature.

When the alloy powders are heated, a heating rate is at least 10° C./min and preferably at least 20° C./min. A heating rate less than 10° C./min is not preferable because an exchange coupling force is weakened and hard magnetic characteristics are deteriorated by a coarsened crystal grain size.

When the spark plasma sintering method is executed, it is preferable to perform sintering within a temperature range in which the correlation of $T_x-200°\ C. \leq T_s°\ C. \leq T_x+200°\ C.$ is satisfied, where $T_s$ represents a sintering temperature and $T_x$ represents a temperature at which the amorphous alloy begins to crystallize. A sintering temperature $T_s$ less than $T_x-200°\ C.$ is not preferable because the temperature is too low to make a hard magnetic alloy of high density, whereas a sintering temperature $T_s$ exceeding Tx+200° C. is also not preferable because the hard magnetic characteristics are deteriorated due to the growth of the fine crystalline phase to particles.

The spark plasma sintering method using the spark plasma sintering apparatus can promptly increase the temperature of the alloy powders at the prescribed heating rate by supplying the pulse current thereto and strictly manage the temperature thereof in accordance with the value of the pulse current. Accordingly, the temperature of the alloy powders can be further more correctly managed in the promptly heating process as compared with the case that they are heated by a heater or the like, whereby the alloy powders can be sintered under conditions which are near to initially designed ideal conditions.

In the above example, the hard magnetic alloy is made by crystallizing the alloy powders or growing them to the particles under the stress by the spark plasma sintering method and solidifying and compacting them simultaneously with or subsequently to the above process. However, it is also possible to make the hard magnetic alloy by crystallizing the alloy powders or growing them to particles in such a manner that the alloy powders are preferably charged into a metal mold and heated to the crystallizing temperature of the amorphous alloy or to a temperature near to it while they are is presses in, for example, a hot press and the alloy powders are solidified and compacted simultaneously with or subsequently to the above process.

When the alloy powders are solidified and compacted in the occurrence of the softening phenomenon, it is preferable to set the relative density of the hard magnetic alloy to at least 90% by regulating a pressure, temperature and compacting time. With this regulation, a resulting hard magnetic alloy is a strong sintered body that has a very fine structure. In addition, the hard magnetic alloy is physically strong and has strong hard magnetism in a small size.

After the alloy powders are crystallized or grown to the particles under the stress, they are densely pressed and at the same time or subsequently the resultant alloy powders are subjected to heat treatment at 600 to 800° C. As a result, a fine crystalline phase having an average crystal grain size of 100 nm or less is participated in the hard magnetic alloy as a main phase, whereby hard magnetic characteristics can be realized. Heat treatment temperature (annealing temperature) less than 600° C. is not preferable because the hard magnetic characteristics cannot be sufficiently obtained due to the small amount of precipitation of a $R_2Fe_{14}B$ phase which realizes the hard magnetic characteristics. Whereas, heat treatment temperature exceeding 800° C. is not also preferable because the fine crystalline phase is grown to particles and the hard magnetic characteristics is lowered.

When the heat treatment is executed, a holding time is preferably within the range of 1–60 minutes. A holding time of one minute or less is not preferable because the amount of precipitation of the $R_2Fe_{14}B$ phase which realizes the hard magnetic characteristics is small. Whereas, a holding time exceeding 60 minutes is not also preferable because the manufacturing cost of the hard magnetic alloy is increased regardless of that a further enhancement of the hard magnetic characteristics cannot be expected.

When conditions under which the fine crystalline phase having the average crystal grain size of 100 nm or less occupies at least 60 vol % of the hard magnetic alloy are selected and further an Fe phase of a body-centered cubic structure or an FeCo phase of a body-centered cubic structure and the $Fe_{14}R_2B$ phase are created in the fine crystalline phase, there can be obtained a hard magnetic alloy having very high hard magnetic characteristics.

Further, it is preferable to select conditions under which a soft magnetic phase or semi-hard magnetic phase having coercive force of 1 kOe or less and a hard magnetic phase having coercive force of 1 kOe or more are contained in the hard magnetic alloy in an amount of at least 10 vol %, to precipitate at least an Fe phase of a body-centered cubic structure or an FeCo phase of a body-centered cubic structure and an Fe—B compound and an amorphous phase between the soft magnetic phases or the semi-hard magnetic phases having the coercive force of 1 kOe or less as well as to precipitate at least an $Fe_{14}R_2B$ phase as a simple body to the hard magnetic phase having the coercive force of 1 kOe or more. This is because that characteristics which stand midway between those of the soft magnetic phase or semi-hard magnetic phase and those of the hard magnetic phase can be obtained by the above arrangement. It is not preferable that the soft magnetic phase or semi-hard phase having the coercive force of 1 kOe or less is contained in an amount less than 10 vol %. This is because that remanent magnetization (Ir) is lowered and the concentration of rare earth elements which are necessary to constitute the hard magnetic phase is increased, although the coercive force of (iHc) of the hard magnetic alloy is increased. Further, it is not preferable that the hard magnetic phase having the coercive force of 1 kOe or more is contained in an amount less than 10 vol % because the coercive force (iHc) of the hard magnetic alloy is lowered.

The hard magnetic alloy obtained by the above method exhibits exchange coupling characteristics that the fine soft magnetic phase or semi-hard magnetic phase are bonded to the hard magnetic phase by realizing the fine structure. Further, since the concentration of Fe contained in the hard magnetic alloy is higher than that of Fe contained in a conventional rare earth magnet, there can be obtained, from the hard magnetic alloy, a strong permanent magnet having remanent magnetization of at least 120 emu/g, a remanence ratio (Ir/Is), which is the ratio of the remanent magnetization (Ir) to saturation magnetization, of at least 0.7 and coercive force (iHc) of at least 2 kOe.

In the hard magnetic alloy, anisotropy is provided with the crystallographic axis of the hard magnetic phase by the amorphous alloy powders which are crystallized or grown to the particles under the stress, whereby uniaxial anisotropy is increased and high remanent magnetization (Ir) is provided with the hard magnetic alloy. Since the hard magnetic alloy is made of the amorphous alloy powders which are bonded to each other under pressure and integrated under the pressure, it can be formed to the permanent magnet which is physically strong and has strong hard magnetism in a small size.

A hard magnetic alloy used to stepping motors can be represented by the following formula of composition:

$T_xM_yR_zB_wSi_t$ wherein T represents at least one element of Fe and Co. Since these elements are a main component of the hard magnetic material according to the present invention and an element for realizing magnetism, the concentration of T is at least 50 at %.

An increase in the composition ratio x of T increases saturation magnetization (Is). To realize high remanent magnetization (Ir) of at least 120 eum/g, at least 150 eum/g of saturated magnetization (Is) is necessary, and it is preferable that the concentration of T is at least 88 at % to realize the above saturated magnetization.

In the hard magnetic material of the present invention, Fe must be contained at least a part of the element.

It is preferable to contain Co in the element T in addition to Fe to reduce the absolute value of the magnetization temperature coefficient, when the hard magnetic material is used in a shape in which a permeance coefficient is made to at least 2 and in particular when the hard magnetic material is used in a shape in which the permeance coefficient is made to at least 10. This is because that when Co is contained in the element T, the temperature change of magnetization and coercive force is reduced by an increase of the Curie temperature of the hard magnetization phase, the temperature change of magnetic characteristics is reduced by an increase in the remanence ratio of magnetization and further the temperature change of the remanent magnetization is reduced by Co which is also contained in the Fe phase having the body-centered cubic structure.

The content of Co is preferably set in the range of 50 at % or less, more preferably in the range of 0.5 at % or more to 30 at % or less and more preferably in the range of 0.5 at % or more to 20 at % or less and it is preferable that the content is suitably set in accordance with the composition and heat treatment conditions of the alloy because an excessive content of Co deteriorates magnetic characteristics.

In the above formula of composition, M represents at least one element of Zr, Nb, Ta and Hf and these elements have a high amorphous forming capability. The addition of M to the hard magnetic material according to the present invention permits the formation of an amorphous phase even if the rare earth element (R) has a low concentration. When the composition ratio y of the element M is increased in place of the rare earth element (R), the coercive force (iHc) is lowered so that the hard magnetic characteristics are changed to soft magnetic characteristics, although the remanent magnetization (Ir) is increased. Further, an increase of the amorphous forming element (M) in place of the element (T) which realizes magnetism decreases the saturation magnetism (Is) and remanent magnetization (Ir). Therefore, the concentration of M is preferably in the range of 0 at % or more to 15 at % or less and more preferably in the range of 0.5 at % or more to 3 at % or less to obtain high remanent magnetization (Ir).

In the above formula of composition, R represents at least one element of rare earth metals, (Sc, Y, La, Ce, Pr, Nd, Pm, Sm, Eu, Gd, Tb, Dy, Ho, Er, Tm, Yb and Lu). An intermetallic compound $R_2Fe_{14}B_1$ which precipitates when an amorphous alloy containing R, Fe and B is heated to a proper temperature in the range of 600–800° C. provides the hard magnetic alloy used to the stepping motor of the present invention with excellent hard magnetic characteristics. An increase in the composition ratio z of the element R decreases the saturation magnetism (Is). At least 150 emu/g of the saturation magnetism (Is) is necessary to obtain high remanent magnetization (Ir) of at least 120 emu/g and it is desirable to set the concentration (z) of R to 7 at % or less to satisfy the above condition.

R is an element which is liable to form an amorphous state, and when the composition ratio of R is excessively small, an excellent amorphous phase or a fine crystalline phase cannot be obtained. Accordingly, it is desirable to set the concentration of R to at least 3 at %.

In addition, when R is partially or entirely composed of Nd and/or Pr, there can be obtained more higher hard magnetic characteristics.

In the above formula of composition, B is an element which is liable to form an amorphous state. Further, a compound $R_2Fe_{14}B$ that precipitates when an amorphous phase containing Fe and B is subjected to heat treatment at a proper temperature of 600–800° C. provides the material of the present invention with hard magnetic characteristics.

It is desirable to set the concentration of B to at least 3 at % to obtain an excellent amorphous phase or fine crystalline phase. However, it is desirable to set the concentration of B to 20 at % or less and more preferably to 7 at % or less to obtain excellent hard magnetic characteristics. This is because that an increase in the composition ratio (w) of B decreases the saturation magnetization (Is), remanent magnetization (Ir) and coercive force (iHc).

An addition of Si in place of the element T can more increase the magnetic characteristics and, in particular, the coercive force (iHc) and maximum energy product $((BH)_{max})$. In addition, the addition of Si can decrease the absolute value of the magnetization temperature coefficient when the hard magnetic alloy is used in the shape by which the permeance coefficient is made to at least 2 and, in particular, when it is used in the shape by which the permeance coefficient is made to at least 10.

An excessively large additive amount of Si rather lowers the magnetic characteristics of the hard magnetic material because the composition ratio of T is lowered by it. Thus, the additive amount of Si is preferably 0.5 at % or more to 5 at % or less, more preferably 0.5 at % or more to 3 at % or less, and it is preferable to set the additive amount in accordance with the composition, heat treatment conditions and so on of the alloy.

Since the rotor of the stepping motor of the present invention is composed of a hard magnetic alloy having a remanence ratio (Ir/Is) of at least 0.7, coercive force (iHc) of at least 2 kOe and remanent magnetization (Ir) of at least 120 emu/g, the rotational torque of the stepping motor can be increased.

Further, since the rotor of the stepping motor of the present invention is composed of a hard magnetic alloy having a magnetization temperature coefficient which is low when it is used in a shape in which the permeance coefficient is high. As a result, the drop of the rotational torque of the stepping motor can be prevented at a high temperature.

Since the hard magnetic alloy of the stepping motor of the present invention is provided with anisotropy and the remanent magnetization thereof can be increased by it because the amorphous alloy powders are crystallized or grown to particles under stress. As a result, the rotational torque of the stepping motor can be increased.

When the hard magnetic alloy is used to the stepping motor, it can be compacted to an optimum shape because it is made of the powders as described above, Further, since the hard magnetic alloy is made by attaching amorphous alloy powders to each other under pressure and integrating them, it is physically strong. Thus, even if the hard magnetic alloy is used to a material for constituting a rotary mechanism such as the rotor of a stepping motor, it has no problem in mechanical strength.

The hard magnetic alloy used to the stepping motor of the present invention contains rare earth elements in the range of 3–7 at % and the amount of the expensive rare earth elements used therein is smaller than that used in a Nb—Fe—B system sintered magnet and a Sm—Co system sintered magnet. Accordingly, the manufacturing cost of the hard magnetic alloy can be reduced to thereby lower the manufacturing cost of the stepping motor.

EXAMPLES

The present invention will be described in more detail with reference to examples.

Amorphous alloys having various compositions of $Fe_{90}Nb_2Nd_5B_3$, $Fe_{89}Nb_2Nd_5B_4$, $Fe_{89}Nb_2Nd_4B_5$ and $Fe_{88}Nb_2Nd_5B_5$ were prepared by the following method. First, an alloy ingot having each of the compositions was made by an arc melting method and a quenched thin strip having a thickness of about 20 μm was obtained by spraying the melt of the alloy onto a copper roll. The resultant quenched thin strip was ground with a rotor speed mill and amorphous alloy powders having a particle size of 50–150 μm were obtained.

The thus obtained amorphous alloy was charged into a mold and a compacted body was obtained by compacting the amorphous alloy under a baking pressure of 630 MPa at a baking temperature of 600° C. for 8 minutes.

A hard magnetic alloy compacted body was obtained by subjecting the resultant compacted body to various heat treatments by changing heat treatment temperature, holding time and heating rate.

Figure 5:
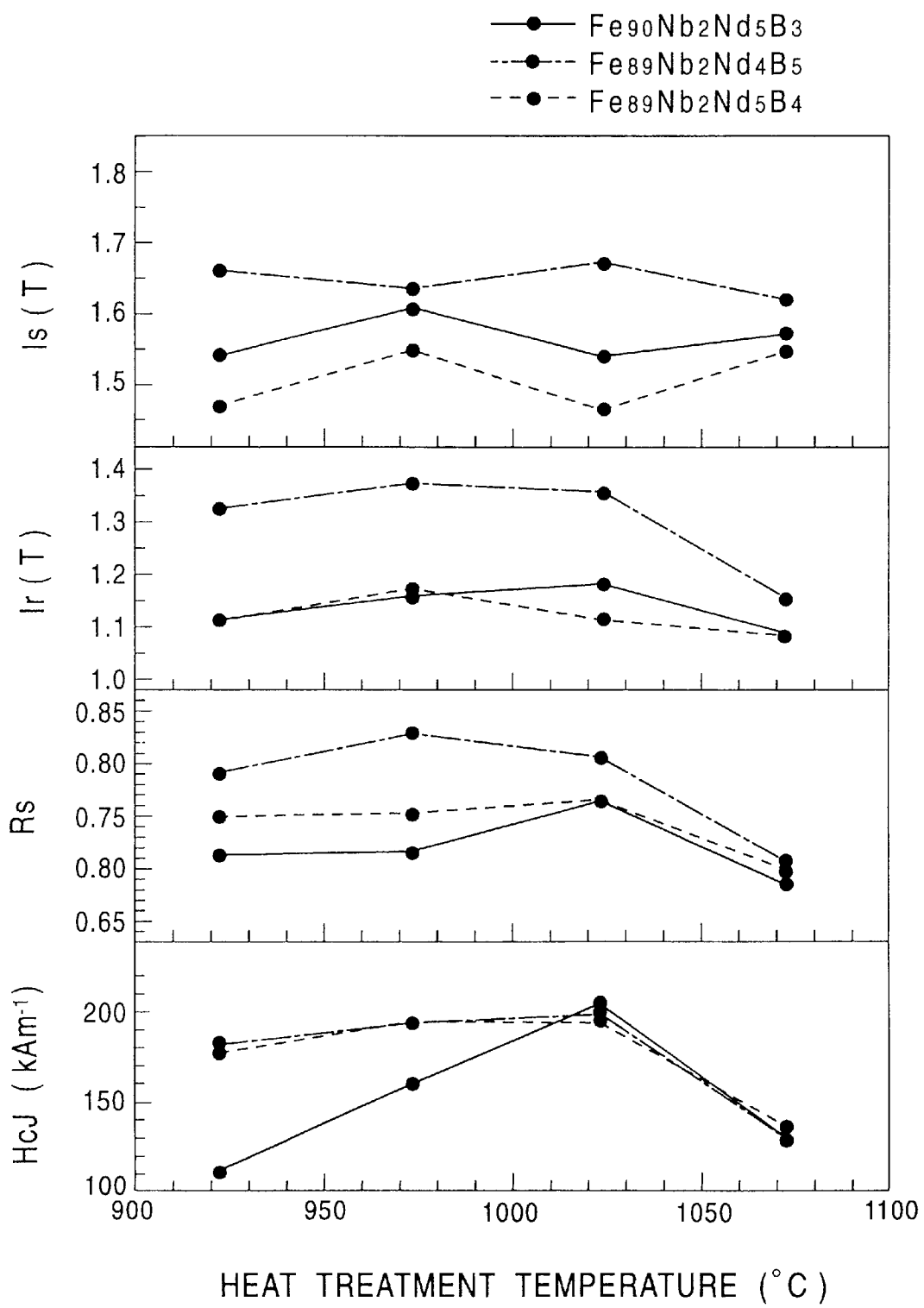
FIG. 5 is graphs of the hard magnetic characteristics of a hard magnetic alloy of the present invention and shows the correlation between the hard magnetic characteristics and heat treatment temperature.
Figure 6:
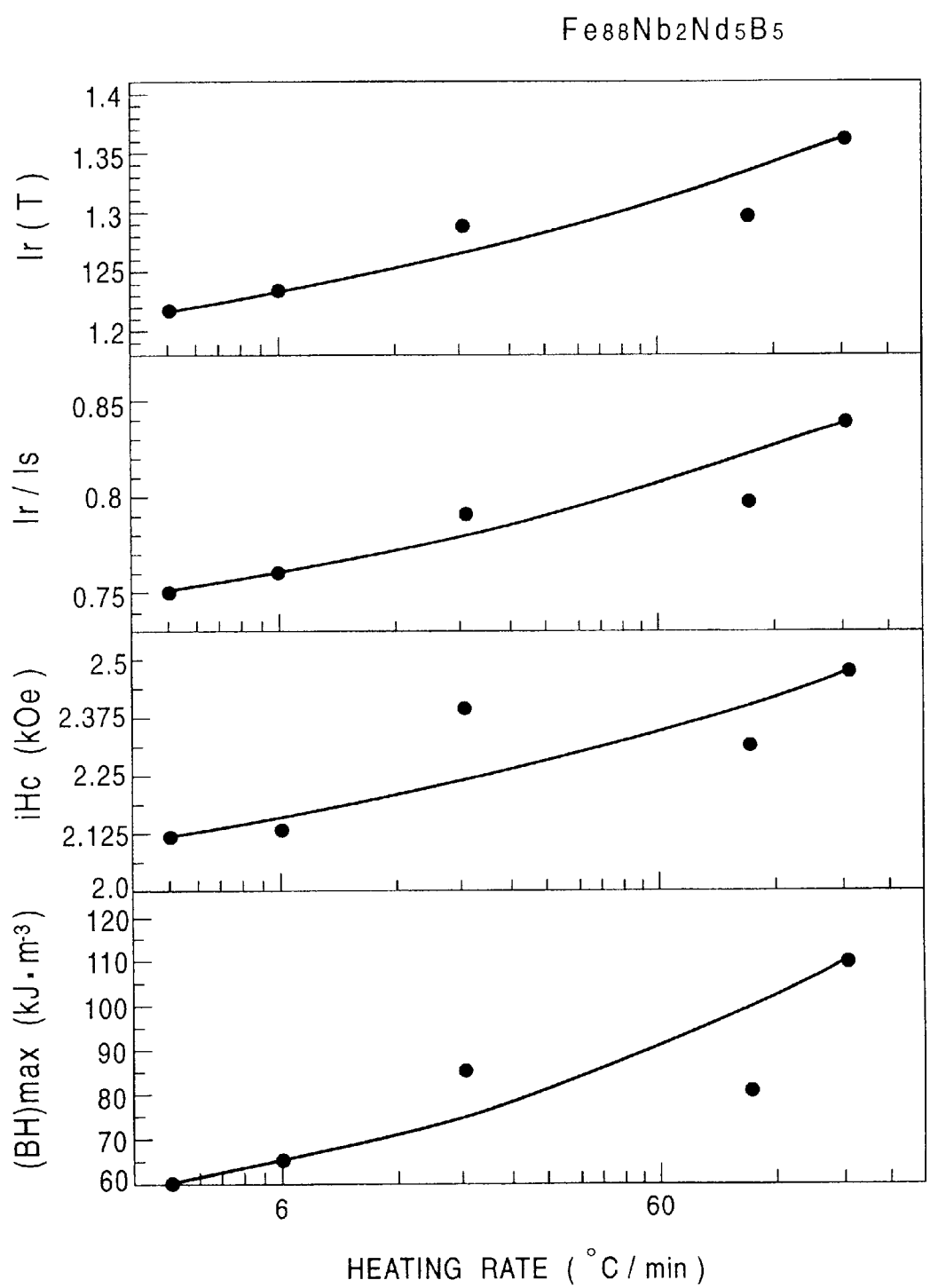
FIG. 6 is graphs of the hard magnetic characteristics of a hard magnetic alloy of the present invention and shows the correlation between the hard magnetic characteristics and a heating rate in heat treatment.

The saturation magnetism (Is), remanent magnetization (Ir), remanence ratio (Ir/Is) and coercive force (iHc) of the thus obtained hard magnetic alloy compacted bodies were measured. Table 1, FIG. 5 and FIG. 6 show the result of measurement.

In the following formulas, a relative density (%) is a value corresponding to a true density (7.6 (g/cm³).

The remanent magnetization (Ir(T)) is a value represented by the following formula:

$$Ir(T)=4\pi \times 7.6 \text{ relative density } (\%) \times Ir(emu/g)/1000$$

The saturation magnetism (Is(T)) is a value represented by the following formula:

$$Is(T)=4\pi \times 7.6 \text{ relative density } (\%) \times Is(emu/g)/1000$$

The coercive force (iHc)(kA/m)) is a value represented by the following formula:

$$iHc(kA/m)=80 \; iHc(Oe)$$

TABLE 1

| Composition | Heating rate (° C./min.) | Holding temp. (° C.) | Holding time (min.) | Is (T) | Ir (T) | Is/Ir | iHC |
|---|---|---|---|---|---|---|---|
| Fe₈₉Nb₂Nd₄B₅ | 180 | 750 | 3 | 1.54 | 1.18 | 0.77 | 198 |
|  | 100 | 750 | 3 | 1.55 | 1.16 | 0.75 | 190 |
|  | 20 | 750 | 3 | 1.53 | 1.15 | 0.75 | 188 |
|  | 10 | 750 | 3 | 1.55 | 1.12 | 0.72 | 187 |
|  | 5 | 750 | 3 | 1.52 | 1.05 | 0.69 | 182 |
| Fe₈₉Nb₂Nd₅B₄ | 180 | 750 | 3 | 1.46 | 1.11 | 0.76 | 198 |
|  | 100 | 750 | 3 | 1.48 | 1.10 | 0.74 | 198 |
|  | 20 | 750 | 3 | 1.45 | 1.06 | 0.73 | 196 |
|  | 10 | 750 | 3 | 1.50 | 1.08 | 0.72 | 190 |
|  | 5 | 750 | 3 | 1.47 | 1.00 | 0.68 | 188 |
| Fe₉₀Nb₂Nd₅B₃ | 180 | 750 | 3 | 1.67 | 1.37 | 0.82 | 210 |
|  | 100 | 750 | 3 | 1.63 | 1.29 | 0.79 | 210 |
|  | 20 | 750 | 3 | 1.72 | 1.34 | 0.78 | 208 |
|  | 10 | 750 | 3 | 1.68 | 1.21 | 0.72 | 200 |
|  | 5 | 750 | 3 | 1.60 | 1.13 | 0.68 | 198 |

As shown in FIG. 5, it is found that when the specimens having the compositions of Fe₉₀Nb₂Nd₅B₃, Fe₈₉Nb₂Nd₅B₄ and Fe₈₉Nb₂Nd₄B₅ were subjected to the heat treatment under the conditions of a heating rate set to 180° C./min, a holding time set to 3 minutes and a holding temperature set to 600–800° C. and more preferably to 700–750° C., the remanent magnetization (Ir), remanence ratio (Ir/Is) and coercive force (iHc) were increased and excellent magnetic characteristics could be obtained.

As shown in Table 1 and FIG. 6, it is found that when the specimen having the composition of Fe₈₈Nb₂Nd₅B₅ was subjected to the heat treatment under the conditions of the holding temperature set to 750° C., the holding time set to 3 minutes and the heating rate set to at least about 10° C./min and more preferably to at least about 180° C./min, excellent hard magnetic characteristics could be obtained.

Figure 7:
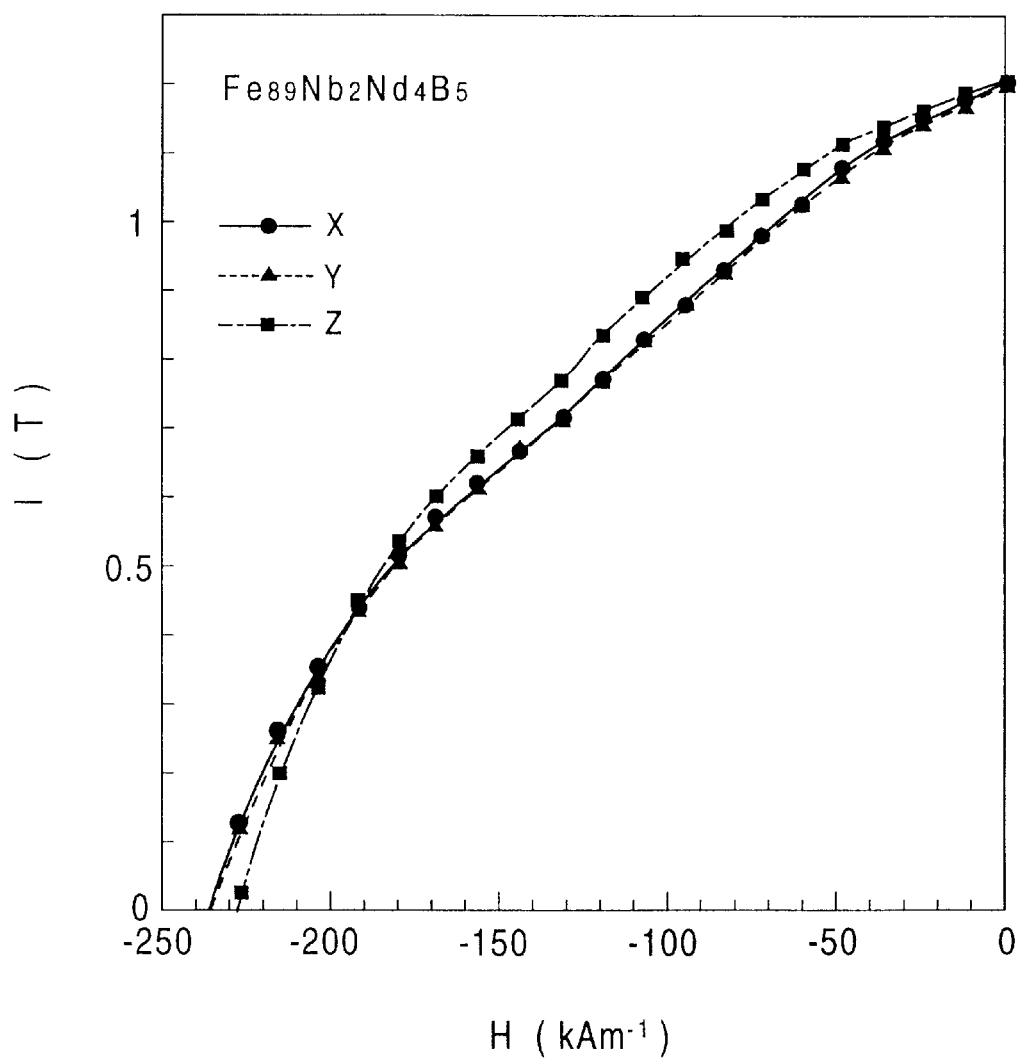
FIG. 7 is a graph showing demagnetizing curves when an alloy having a composition of $Fe_{89}Nb_2Nd_4B_5$ is cut to a cubic member and a magnetic field is imposed thereon in an X-direction, y-direction and z-direction and measured.
Figure 8:
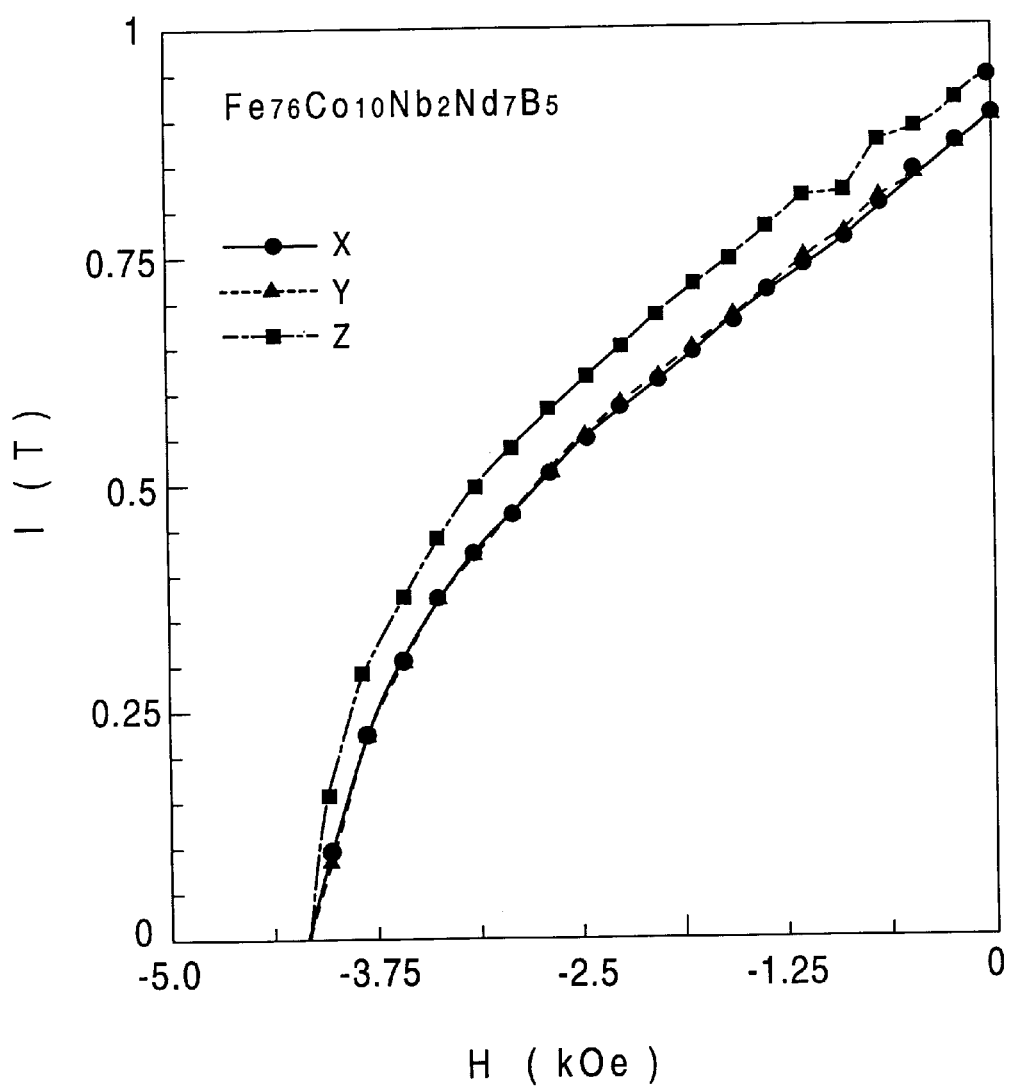
FIG. 8 is a graph showing demagnetizing curves when an alloy having a composition of $Fe_{76}Co_{10}Nb_2Nd_7B_5$ is cut to a cubic member and a magnetic field is imposed thereon in the X-direction, y-direction and z-direction and measured.
Figure 9:
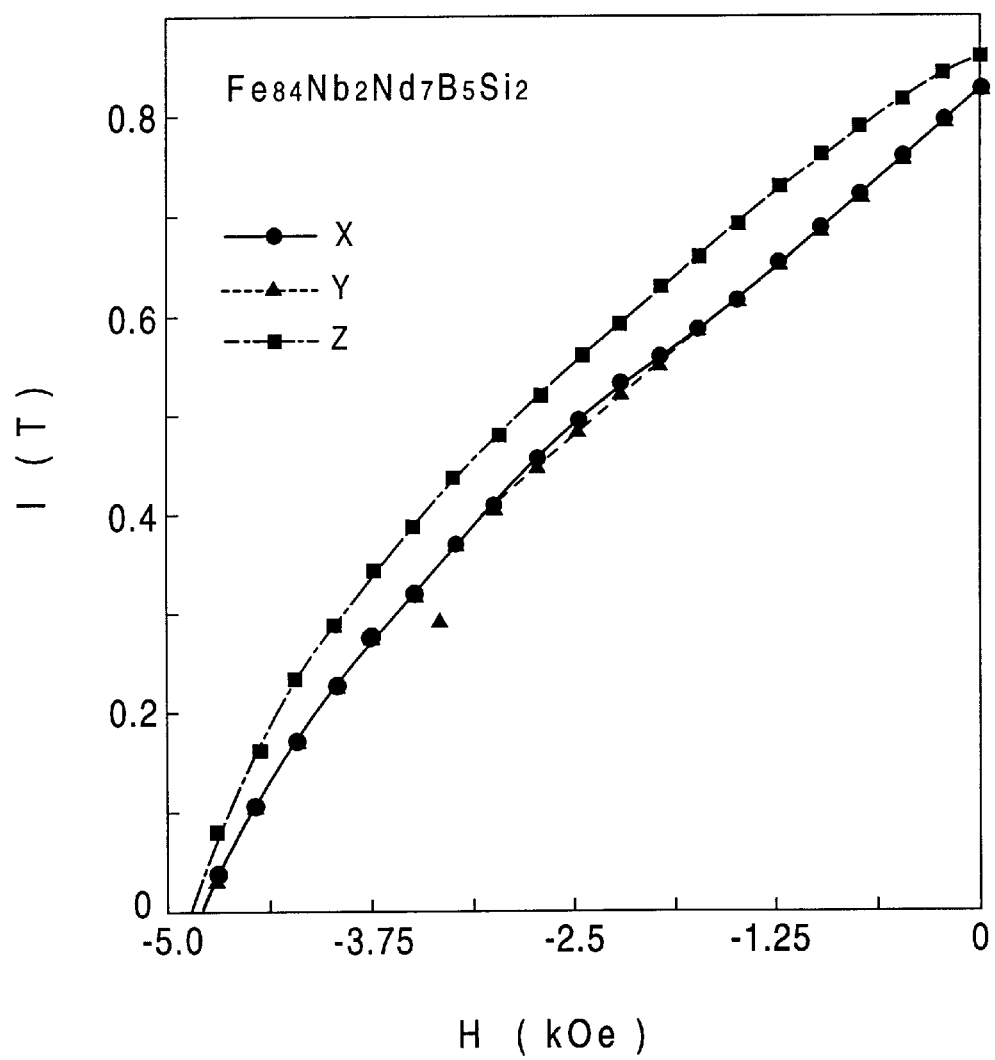
FIG. 9 is a graph showing demagnetizing curves when an alloy having a composition of $Fe_{84}Nb_2Nd_7B_5Si_2$ is cut to a cubic member and a magnetic field is imposed thereon in the X-direction, y-direction and z-direction and measured.
Figure 10:
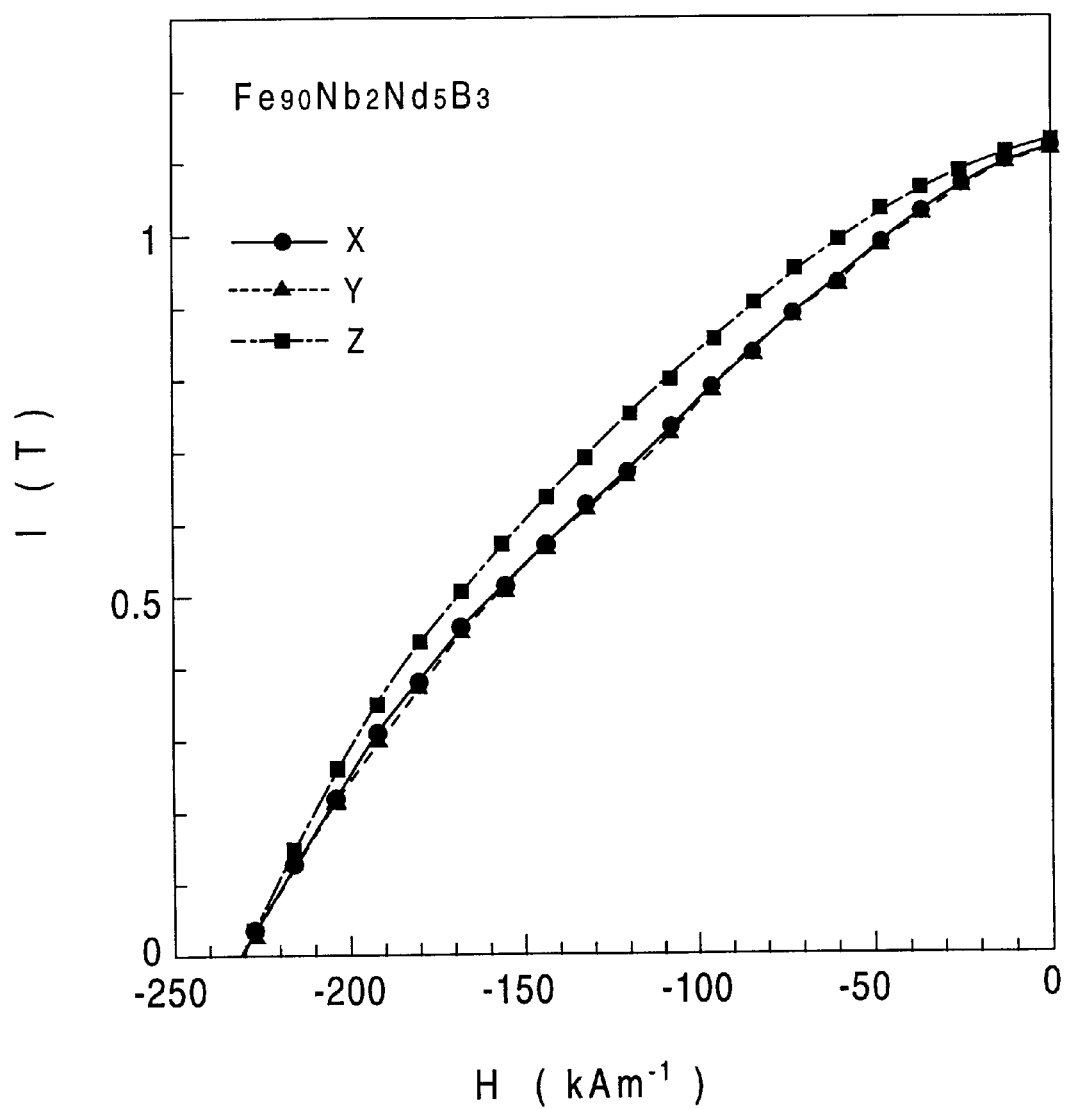
FIG. 10 is a graph showing demagnetizing curves when an alloy having a composition of $Fe_{90}Nb_2Nd_5B_3$ is cut to a cubic member and a magnetic field is imposed thereon in the X-direction, y-direction and z-direction and measured.

Further, each of compacted bodies obtained by solidifying and compacting amorphous alloy powders having the respective compositions of Fe₈₉Nb₂Nd₄B₅, Fe₈₉Nb₂Nd₅B₄, Fe₇₆Co₁₀Nb₂Nd₇B₅ and Fe₈₄Nb₂Nd₇B₅Si₂ were cut to a cube of 5×5×5 mm. A hard magnetic alloy cube was obtained by subjecting the above cube to heat treatment under the conditions of the heating rate set to 180° C./min, the holding temperature set to 750° C. and the holding time set to 3 minutes and thereafter the magnetizing curve of the hard magnetic alloy cube was measured while applying a magnetic field of 5T to the cube. FIG. 7, FIG. 8 and FIG. 9 show the magnetizing curves. The respective measuring results were subjected to anti-magnetic-field correction.

FIG. 7–FIG. 10 show the demagnetizing curves of the hard magnetic alloy cubes in an X-direction, Y-direction and Z-direction. When the amorphous powders were solidified and compacted, a pressure was applied thereto in the Z-direction and further the amorphous powders were crystallized or grown to particles in the state the pressure was applied thereto.

Curves swelling in the Z-direction are obtained to the hard magnetic alloys having the respective compositions. A reason why hard magnetic characteristics are enhanced in the Z-direction as shown in the curves is that a hard magnetic phase can be crystallized in the same direction by precipitating it under pressure.

Figure 11:
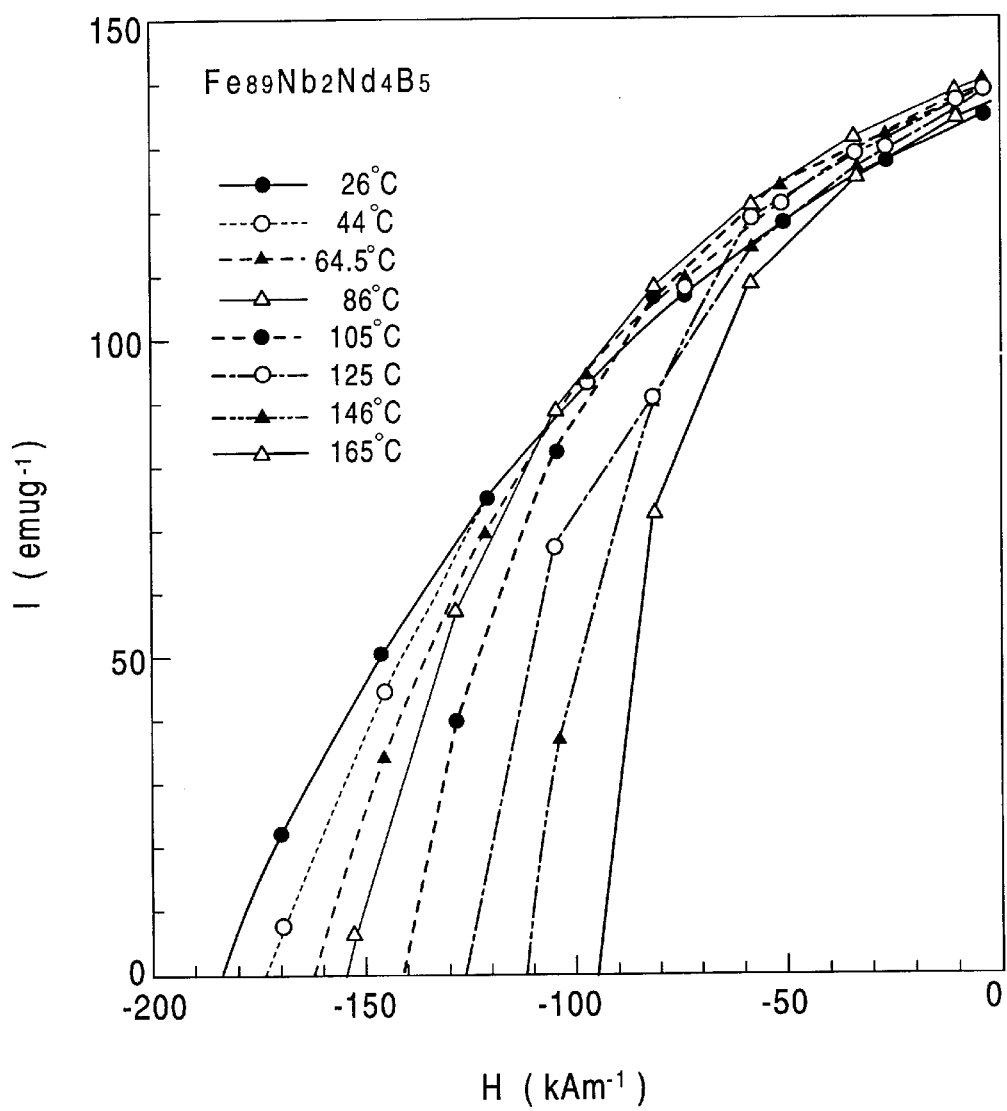
FIG. 11 is a graph showing demagnetizing curves when an alloy having a composition of $Fe_{89}Nb_2Nd_4B_5$ is heated from a room temperature to about 160° C. in a magnetic field of 10 kOe and in vacuum.
Figure 12:
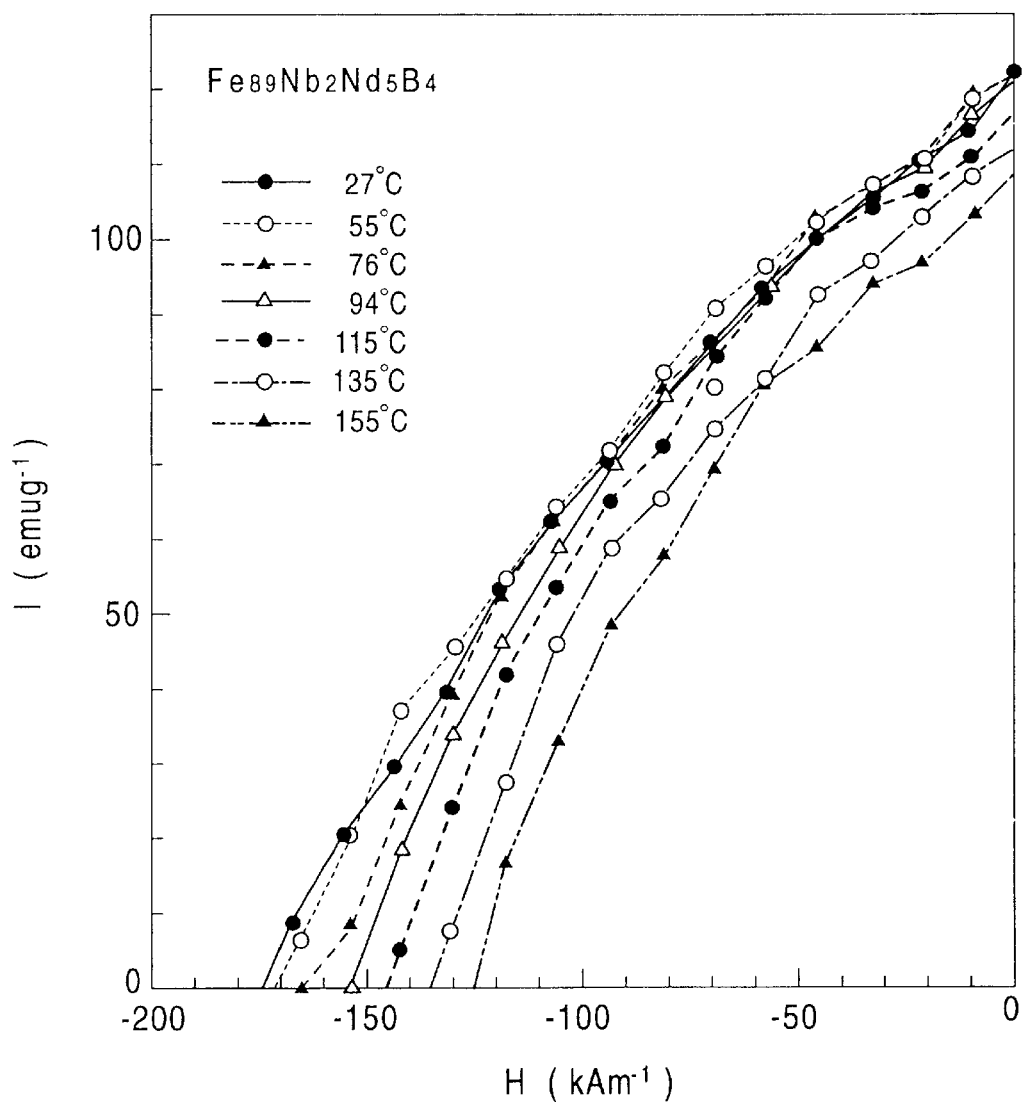
FIG. 12 is a graph showing demagnetizing curves when an alloy having a composition of $Fe_{89}Nb_2Nd_5B_4$ is heated from a room temperature to about 160° C. in a magnetic field of 10 kOe and in vacuum.
Figure 13:
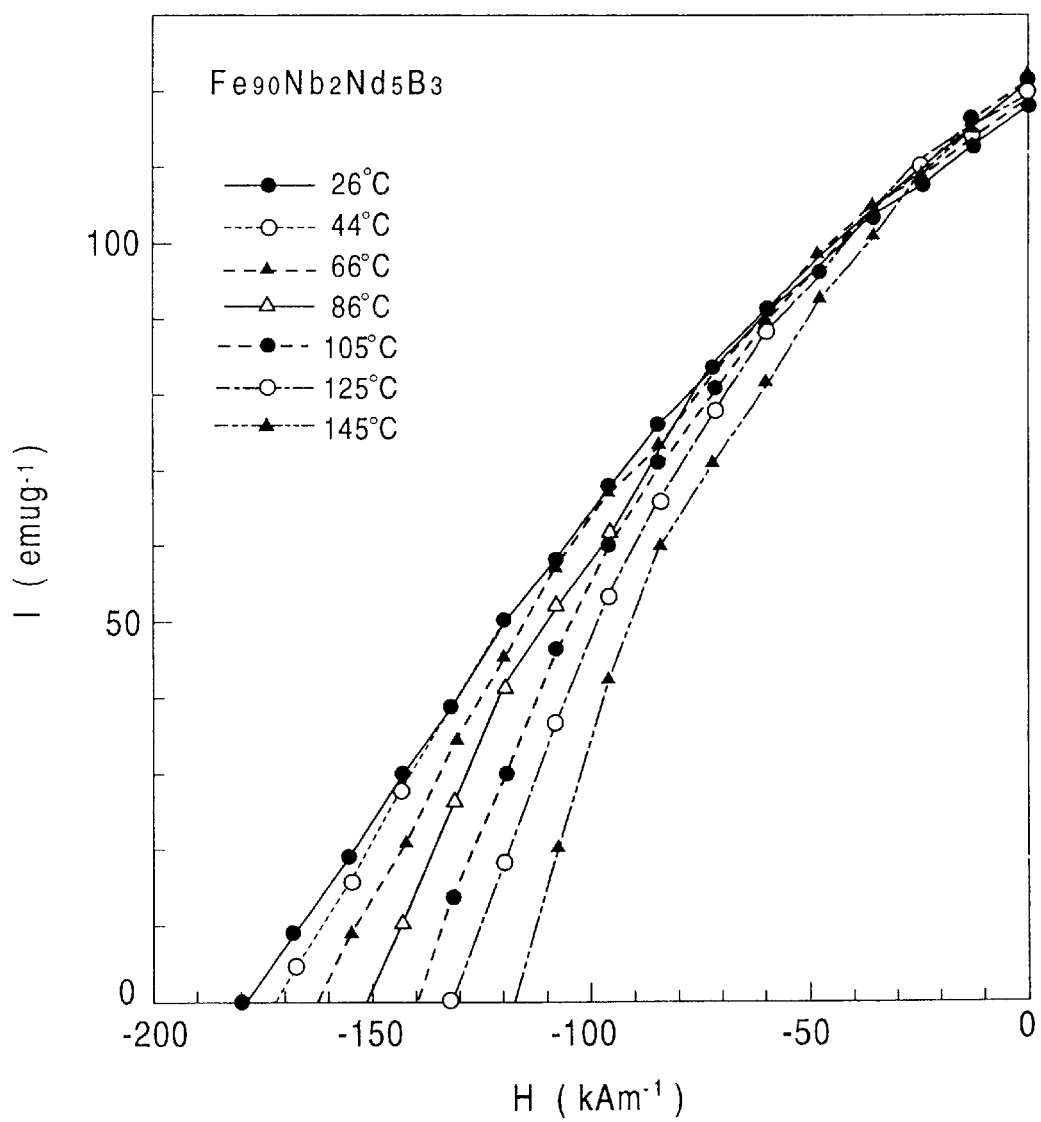
FIG. 13 is a graph showing demagnetizing curves when an alloy having a composition of $Fe_{90}Nb_2Nd_5B_3$ is heated from a room temperature to about 160° C. in a magnetic field of 10 kOe and in vacuum.

Further, the amorphous alloy thin strip of each composition was subjected to heat treatment under the conditions of the heating ratio set to 180° C., the holding temperature set to 750° C. and the holding time set to 3 minutes and then the thin strip was left in a magnetic field of 10 kOe and in vacuum at a room temperature to about 160° C. FIG. 11, FIG. 12 and FIG. 13 show demagnetizing curves of the thin strip at the time.

It can be found from FIG. 11–FIG. 13 that a higher permeance coefficient, that is, larger magnetization reduces the change of magnetization to temperature.

The magnetization temperature coefficients of the examples were compared with that of an alloy having a composition of Nd₂Fe₁₄B₁ as a comparative example. Table 2 shows the result of comparison. The magnetization temperature coefficients of the hard magnetic alloys of the present invention are lower than that of the Nd—Fe—B system magnet. Accordingly, when the hard magnetic alloys are used to a stepping motor, the rotational torque of the stepping motor is not lowered even if the temperature thereof is increased.

TABLE 2

| | Composition | Absolute value of temperature coefficient of magnetization at permeance coefficient (p) of 10 (%/° C.) (room temperature ~ 120° C.) |
|---|---|---|
| Examples | Fe₈₉Nb₂Nd₄B₅ | 0.06 |
|  | Fe₈₉Nb₂Nd₅B₄ | 0.06 |
|  | Fe₉₀Nb₂Nd₅B₃ | 0.03 |
| Comparative example | Nd₂Fe₁₄B₁ | 0.11 |

The scope of technology of the present invention is by no means limited to the above embodiment and it goes without saying that various modifications can be made within the scope which does not depart from the gist of the present invention. Although the above embodiment shows the example that the present invention is applied to the hybrid type stepping motor, it is also applicable to a permanent magnet type stepping motor. In addition, although the above embodiment shows the example that the present invention is applied to a rotating type motor, it is also applicable to a straight-traveling type motor.

What is claimed is:

1. A stepping motor having a stator provided with an electromagnet and a rotor composed of a hard magnetic alloy, wherein the hard magnetic alloy has a composition represented by the following formula:

$T_x M_y R_z B_w Si_t$ wherein T represents at least one element selected from Fe and Co, M represents at least one element selected from Nb, Zr, Hf and Ta and R represents at least one element selected from rare earth elements and suffixes x, y, z, w and t which represent a composition ratio satisfy $88 \leq x \leq 92$, $0.5 \leq y \leq 3$, $3 \leq z \leq 7$, $3 \leq w \leq 7$ and $0 \leq t \leq 5$ atomic percent, and further wherein said hard magnetic alloy has a remanence ratio (Ir/Is) of at least 0.7 where (Ir) is the remanent magnetization and (Is) is the saturation magnetization.

2. A stepping motor according to claim 1, wherein the absolute value of a magnetization temperature coefficient of the hard magnetic alloy is 0.1%/° C. or less when it is used in a shape in which a permeance coefficient is made to at least 10.

3. A stepping motor having a stator provided with an electromagnet and a rotor composed of a hard magnetic alloy, wherein the hard magnetic alloy has a composition represented by the following formula:

$T_x M_y R_z B_w Si_t$ wherein T represents at least one element selected from Fe and Co, M represents at least one element selected from Nb, Zr, Hf and Ta and R represents at least one element selected from rare earth elements and suffixes x, y, z, w and t which represent a composition ratio satisfy $88 \leq x \leq 92$, $0.5 \leq y \leq 3$, $3 \leq z \leq 7$, $3 \leq w \leq 7$ and $0 \leq t \leq 5$ atomic percent, and further wherein said hard magnetic alloy has a remanence ratio (Ir/Is) of at least 0.7 where (Ir) is the remanent magnetization and (Is) is the saturation magnetization, and has remanent magnetization (Ir) of at least 120 emu/g and coercive force (iHc) of at least 2 kOe.

4. A stepping motor according to claim 3, wherein the absolute value of a magnetization temperature coefficient of the hard magnetic alloy is 0.1%/° C. or less when it is used in a shape in which a permeance coefficient is made to at least 10.

5. A stepping motor having a stator provided with an electromagnet and a rotor composed of a hard magnetic alloy, wherein the hard magnetic alloy has a composition represented by the following formula:

$$T_xM_yR_zB_wSi_t$$

wherein T represents at least one element selected from Fe and Co, M represents at least one element selected from Nb, Zr, Hf and Ta and R represents at least one element selected from rare earth elements and suffixes x, y, z, w and t which represent a composition ratio satisfy $88 \leq x \leq 92$, $0.5 \leq y \leq 3$, $3 \leq z \leq 7$, $3 \leq w \leq 7$ and $0 \leq t \leq 5$ atomic percent, and further wherein said hard magnetic alloy has a remanence ratio (Ir/Is) of at least 0.7 where (Ir) is the remanent magnetization and (Is) is the saturation magnetization, and contains a fine crystalline phase having an average crystal grain size of 100 nm or less as a main phase.

6. A stepping motor according to claim 5, wherein the absolute value of a magnetization temperature coefficient of the hard magnetic alloy is 0.1%/° C. or less when it is used in a shape in which a permeance coefficient is made to at least 10.

7. A stepping motor having a stator provided with an electromagnet and a rotor composed of a hard magnetic alloy, wherein the hard magnetic alloy has a composition represented by the following formula:

$$T_xM_yR_zB_wSi_t$$

wherein T represents at least one element selected from Fe and Co, M represents at least one element selected from Nb, Zr, Hf and Ta and R represents at least one element selected from rare earth elements and suffixes x, y, z, w and t which represent a composition ratio satisfy $88 \leq x \leq 92$, $0.5 \leq y \leq 3$, $3 \leq z \leq 7$, $3 \leq w \leq 7$ and $0 \leq t \leq 5$ atomic percent, and further wherein said hard magnetic alloy has a remanence ratio (Ir/Is) of at least 0.7 where (Ir) is the remanent magnetization and (Is) is the saturation magnetization, and has remanent magnetization (Ir) of at least 120 emu/g and coercive force (iHc) of at least 2 kOe, and contains a fine crystalline phase having an average crystal grain size of 100 nm or less as a main phase.

8. A stepping motor according to claim 7, wherein the absolute value of a magnetization temperature coefficient of the hard magnetic alloy is 0.1%/° C. or less when it is used in a shape in which a permeance coefficient is made to at least 10.

9. A stepping motor having a stator provided with an electromagnet and a rotor composed of a hard magnetic alloy, wherein the hard magnetic alloy comprises at least one element T of Fe and Co, at least one element R of rare earth elements and B, and has a remanence ratio (Ir/Is) of at least 0.7 where (Ir) is the remanent magnetization and (Is) is the saturation magnetization, wherein the absolute value of a magnetization temperature coefficient of the hard magnetic alloy is 0.1%/° C. or less when it is used in a shape in which a permeance coefficient is made to at least 10.

10. A stepping motor having a stator provided with an electromagnet and a rotor composed of a hard magnetic alloy, wherein the hard magnetic alloy comprises at least one element T of Fe and Co, at least one element R of rare earth elements and B, and has a remanence ratio (Ir/Is) of at least 0.7 where (Ir) is the remanent magnetization and (Is) is the saturation magnetization, and has remanent magnetization (Ir) of at least 120 emu/g and coercive force (iHc) of at least 2 kOe, wherein the absolute value of a magnetization temperature coefficient of the hard magnetic alloy is 0.1%/° C. or less when it is used in a shape in which a permeance coefficient is made to at least 10.

11. A stepping motor having a stator provided with an electromagnet and a rotor composed of a hard magnetic alloy, wherein the hard magnetic alloy comprises at least one element T of Fe and Co, at least one element R of rare earth elements and B, and has a remanence ratio (Ir/Is) of at least 0.7 where (Ir) is the remanent magnetization and (Is) is the saturation magnetization, and contains a fine crystalline phase having an average crystal grain size of 100 nm or less as a main phase, wherein the absolute value of a magnetization temperature coefficient of the hard magnetic alloy is 0.1%/° C. or less when it is used in a shape in which a permeance coefficient is made to at least 10.

12. A stepping motor having a stator provided with an electromagnet and a rotor composed of a hard magnetic alloy, wherein the hard magnetic alloy comprises at least one element T of Fe and Co, at least one element R of rare earth elements and B, and has a remanence ratio (Ir/Is) of at least 0.7 where (Ir) is the remanent magnetization and (Is) is the saturation magnetization, and has remanent magnetization (Ir) of at least 120 emu/g and coercive force (iHc) of at least 2 kOe, and contains a fine crystalline phase having an average crystal grain size of 100 nm or less as a main phase, wherein the absolute value of a magnetization temperature coefficient of the hard magnetic alloy is 0.1%/° C. or less when it is used in a shape in which a permeance coefficient is made to at least 10.

* * * * *